(12) United States Patent
Ohtani et al.

(10) Patent No.: US 11,994,477 B2
(45) Date of Patent: May 28, 2024

(54) INSPECTION DEVICE, PACKAGING SHEET MANUFACTURING DEVICE, AND INSPECTION METHOD

(71) Applicant: CKD CORPORATION, Aichi (JP)

(72) Inventors: Takamasa Ohtani, Aichi (JP); Eiji Ohta, Aichi (JP); Yukihiro Taguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 231 days.

(21) Appl. No.: 17/825,419

(22) Filed: May 26, 2022

(65) Prior Publication Data

US 2022/0283098 A1 Sep. 8, 2022

Related U.S. Application Data

(63) Continuation of application No. PCT/JP2020/044187, filed on Nov. 27, 2020.

(30) Foreign Application Priority Data

Feb. 13, 2020 (JP) ................................. 2020-022031

(51) Int. Cl.
*G01N 21/90* (2006.01)
*G01N 21/88* (2006.01)

(52) U.S. Cl.
CPC . *G01N 21/9054* (2013.01); *G01N 2021/8887* (2013.01)

(58) Field of Classification Search
CPC ....... G01N 21/9054; G01N 2021/8887; G01N 21/89; G01N 21/8903; G01N 21/90; G01N 21/9036; G01N 21/894
See application file for complete search history.

(56) References Cited

U.S. PATENT DOCUMENTS

| 11,017,523 B2* | 5/2021 | Taguchi | ................ B32B 15/082 |
| 11,237,115 B2* | 2/2022 | Inoguchi | ............ G01N 21/9508 |
| 2020/0182800 A1* | 6/2020 | Inoguchi | ............ G01N 21/8901 |

FOREIGN PATENT DOCUMENTS

JP 2015-94694 A 5/2015

OTHER PUBLICATIONS

International Preliminary Report on Patentability issued in corresponding International Application No. PCT/JP2020/044187 mailed Aug. 25, 2022 (10 pages).

(Continued)

*Primary Examiner* — Hung V Nguyen
(74) *Attorney, Agent, or Firm* — Osha Bergman Watanabe & Burton LLP

(57) ABSTRACT

An inspection device includes: an irradiator that radiates, before content is placed into the pocket, ultraviolet light toward one face of the container film; imaging devices that take images of the container film from another face side of the container film; and a processor that determines, based on the images, whether the pocket includes a pinhole, at least two of the imaging devices being each disposed on respective sides of the container film in a width direction such that the pocket is placed between the two imaging devices, and while the container film is being conveyed along a conveyance path, the two imaging devices take images of the pocket at a timing when the pocket is located at an upstream-side position, a middle-side position, and a downstream-side position of the conveyance path.

17 Claims, 11 Drawing Sheets

(56) References Cited

OTHER PUBLICATIONS

International Search Report issued in corresponding International Application No. PCT/JP2020/044187 mailed Feb. 2, 2021 (5 pages).
Written Opinion issued in corresponding International Application No. PCT/JP2020/044187 mailed Feb. 2, 2021 (3 pages).

* cited by examiner

INSPECTION DEVICE, PACKAGING SHEET MANUFACTURING DEVICE, AND INSPECTION METHOD

BACKGROUND

Technical Field

The present disclosure relates to an inspection device configured to perform an inspection for any pinhole in a container film, a packaging sheet manufacturing apparatus provided with the inspection device, and a method of inspecting a container film.

Description of Related Art

A PTP (press through pack) sheet is known as a packaging sheet generally used in the field of pharmaceutical products and the like. The PTP sheet includes a container film that has pocket portions with contents such as tablets placed therein, and a cover film that is mounted to the container film such as to seal an opening side of the pocket portions.

Such a packaging sheet as described above may be manufactured by a packaging sheet manufacturing apparatus. The packaging sheet manufacturing apparatus includes, for example, a unit configured to form pocket portions in a conveyed container film in a belt-like form; a unit configured to fill the pocket portions with contents; a unit configured to mount a cover film in a belt-like form to the container film such as to seal an opening side of the pocket portions; and a unit configured to punch out each unit of packaging sheet from a belt-like packaging film comprised of the container film and the cover film.

The container film may have a hole called pinhole. When a pinhole is present in the pocket portion, this may cause difficulties with regard to, for example, the preservability of the content. Accordingly, in the process of manufacturing the packaging sheet, an inspection may be performed to check for the presence of any pinhole in at least the pocket portion, after formation of the pocket portion.

A known configuration of an inspection device for the pinhole includes an irradiation unit configured to irradiate a container film having pocket portions with a predetermined light; an imaging unit configured to take an image of the light transmitted through the container film; and a determination unit (image processing unit) configured to determine whether there is any pinhole or not, based on the image taken and obtained by the imaging unit (as described in, for example, Patent Literature 1). This Patent Literature 1 describes using ultraviolet light that has a lower transmittance than that of visible light, as the predetermined light, in order to allow for detection of any pinhole with high accuracy even when the container film is transparent.

Patent Literature

Patent Literature 1; JP 2015-94694A

In the technical configuration described in the above Patent Literature 1, a light collecting sheet (prism sheet) is placed between the container film and the imaging unit. When the light passes through the light collecting sheet, the direction of the light is changed to a direction along an optical axis direction in the imaging unit. The light collecting sheet (prism sheet) is, however, generally made of a resin and has a low transmittance of ultraviolet light. Accordingly, in a configuration that radiates ultraviolet light from the irradiation unit, the amount of the ultraviolet light radiating to the container film including the pocket portions is insufficient. As a result, this is likely to fail in sufficiently enhancing the detection accuracy for any pinhole in the pocket portion.

SUMMARY

One or more embodiments of the present disclosure provide an inspection device or the like that achieves an extremely high detection accuracy for any pinhole in a pocket portion.

The following describes each of various aspects provided adequately in view of above issues. Functions and advantageous effects that are characteristic of each of the aspects are also described as appropriate.

Aspect 1. There is provided an inspection device used in a process of manufacturing a packaging sheet that is configured by mounting a cover film to a container film made of a resin, such as to close a pocket portion (i.e., pocket) formed in the container film, in such a state that a content is placed or housed in the pocket portion that has a bottom wall portion and a lateral wall portion. The inspection device comprises an irradiation unit (i.e., irradiator) configured to radiate ultraviolet light toward one face of the container film in a previous stage before the content is placed into the pocket portion in the conveyed container film in a belt-like (i.e., belt-shaped) form; an imaging unit (i.e., imaging device) configured to take an image of the container film from a side of the other face (or another face side) of the container film; and a determination unit (i.e., processor) configured to determine whether there is any pinhole or not in at least the pocket portion, based on the image taken by the imaging unit. At least one pair of the imaging units are provided on respective sides (or both sides) in a width direction of the container film at such positions that the pocket portion is placed between the imaging units. An upstream-side position denotes a position that causes (at which the pair of imaging devices can take) images of at least an upstream-side lateral wall portion that is included in the lateral wall portion and that is located on an upstream side along a conveying direction of the container film, to be taken with the pair of imaging units; a middle-side position denotes a position that causes (at which the pair of imaging devices can take) images of at least the bottom wall portion and front-side lateral wall portions that are included in the lateral wall portion and that are directly opposed to the imaging units in the width direction of the container film, to be taken with the pair of imaging units; and a downstream-side position denotes a position that causes (at which the pair of imaging devices can take) images of at least a downstream-side lateral wall portion that is included in the lateral wall portion and that is located on a downstream side along the conveying direction of the container film, to be taken with the pair of imaging units. The pair of imaging units are configured to take images of at least the pocket portion, when the pocket portion is located at the upstream-side position, when the pocket portion is located at the middle-side position, and when the pocket portion is located at the downstream-side position. The determination unit is configured to determine whether there is any pinhole or not in at least the pocket portion, based on a plurality of images that are taken by the pair of imaging units and that include information with regard to the downstream-side lateral wall portion, the front-side lateral wall portions, the upstream-side lateral wall portion, and the bottom wall portion.

In the case where a plurality of pocket portions are provided along the width direction of the container film, the expression "at such positions that the pocket portion is placed between the imaging unit" means "at such positions that all the pocket portions provided along the width direction of the container film are placed between the imaging units" (the same applies to Aspect 6 described later).

In the inspection device of Aspect 1, the imaging units are configured to take images of at least an upstream-side lateral wall portion of a pocket portion when the pocket portion is located at the upstream-side position, to take images of at least front-side lateral wall portions of the pocket portion when the pocket portion is located at the middle-side position, and to take images of at least a downstream-side lateral wall portion of the pocket portion when the pocket portion is located at the downstream-side position. In other words, in the case where the container film and the imaging units are viewed along a direction perpendicular to the container film, the imaging units take images of the respective lateral wall portions as imaging objects, when the direction of a vector from a pocket portion to the imaging unit (more specifically, to the imaging unit closer to the pocket portion) (in other words, the traveling direction of light from the pocket portion toward the imaging unit) becomes more parallel to the thickness direction of each of the lateral wall portions (the upstream-side lateral wall portion, the front-side lateral wall portions or the downstream-side lateral wall portion) as the imaging object and the imaging unit comes closer to such a state that the imaging unit is more directly opposed to each of the lateral wall portions of the pocket portion. Accordingly, when there is any pinhole in the lateral wall portion, the ultraviolet ray passing through the pinhole is more likely to reach the imaging unit. This configuration thus enables any pinhole that is present in the lateral wall portion to be more distinct in the taken images.

Furthermore, in the inspection device of Aspect 1, the pair of imaging units are configured to take images of the bottom wall portion of the pocket portion that is located at the middle-side position. In other words, the pair of imaging units are placed at positions sufficiently away from the container film along the direction perpendicular to the container film. Accordingly, in the case where the container film and the imaging units are viewed along the conveying direction of the container film, the imaging units take images of the bottom wall portion as an imaging object, when the direction of a vector from a pocket portion to the imaging unit (more specifically, to the imaging unit closer to the pocket portion) (in other words, the traveling direction of light from the pocket portion toward the imaging unit) becomes more parallel to the thickness direction of the bottom wall portion as the imaging object and the imaging unit comes closer to such a state that the imaging unit is more directly opposed to the bottom wall portion. Additionally, in the imaging device of Aspect 1, the imaging units take images of the bottom wall portion, when a pocket portion is located at the middle-side position, in other words, when the bottom wall portion of the pocket portion comes closest to the imaging unit. As a result, when there is any pinhole in the bottom wall portion, the ultraviolet ray passing through the pinhole is more likely to reach the imaging unit. This configuration thus enables any pinhole that is present in the bottom wall portion to be more distinct in the taken images.

Additionally, the inspection device of Aspect 1 is provided with at least one pair of the imaging units on the respective sides in the width direction of the container film at such positions that the pocket portion is placed between the imaging units. This configuration enables part of a pocket portion that is not imaged by one imaging unit to be imaged by the other imaging unit. Accordingly, this configuration enables the images with regard to the entire area of the pocket portion to be taken more reliably.

As described above, the configuration of Aspect 1 enables any pinhole that is present in the pocket portion to be more distinct in the taken and obtained images, while enabling the images with regard to the entire area of the pocket portion to be taken and obtained more reliably. As a result, this configuration achieves the extremely high detection accuracy for any pinhole in the pocket portion.

The determination unit may be configured to determine whether there is any pinhole or not in a portion other than the pocket portion (i.e., a flange portion) of the container film, based on the taken images. The inspection device may be provided with only one pair of the imaging units like Aspect 2 described below or may be provided with three or more imaging units.

Aspect 2. The inspection device described in Aspect 1 may be provided with only one pair of the imaging units.

The inspection device of Aspect 2 is provided with only one pair of the imaging units. This effectively achieves simplification and size reduction of the inspection device, as well as reduction of the costs with regard to manufacture, maintenance and others of the inspection device.

Aspect 3. In the inspection device described in either Aspect 1 or Aspect 2, a plurality of the pocket portions may be provided to be arrayed along the conveying direction of the container film, and the imaging units may be configured to simultaneously take images of the pocket portion located at the upstream-side position, the pocket portion located at the middle-side position, and the pocket portion located at the downstream-side position by one single imaging operation with the imaging units.

The configuration of Aspect 3 enables the images required for the inspection to be taken and obtained by a less number of imaging operations and enhances the inspection efficiency.

Aspect 4. In the inspection device described in any of Aspects 1 to 3, one pair of the imaging units may be provided on respective sides in the width direction of the container film at such positions that the container film is placed between the imaging units.

In the case where the container film and the imaging units are viewed along the conveying direction of the container film, the configuration of Aspect 4 enables images of the front-side lateral wall portions to be taken, when the direction of a vector from a pocket portion to the imaging unit (more specifically, to the imaging unit closer to the pocket portion) (in other words, the traveling direction of light from the pocket portion toward the imaging unit) becomes more parallel to a thickness direction of the front-side lateral wall portions. Accordingly, when there is any pinhole in the front-side lateral wall portion, ultraviolet ray passing through the pinhole is more likely to reach the imaging unit. This configuration thus enables any pinhole that is present in the front-side lateral wall portion to be more distinct in the images. This configuration further increases the detection accuracy for any pinhole in the front-side lateral wall portions.

Aspect 5. There is provided a packaging sheet manufacturing apparatus, comprising the inspection device described in any of Aspects 1 to 4.

The configuration of Aspect 5 has similar functions and advantageous effects to those of Aspect 1 described above and the like.

Aspect 6. There is provided an inspection method used in a process of manufacturing a packaging sheet that is configured by mounting a cover film to a container film made of a resin, such as to close a pocket portion formed in the container film, in such a state that a content is placed in the pocket portion that has a bottom wall portion and a lateral wall portion. The inspection method comprises an irradiation process of radiating ultraviolet light toward one face of the container film in a previous stage before the content is placed into the pocket portion in the conveyed container film in a belt-like form; an imaging process of taking images of the container film from a side of the other face or other face side of the container film by using at least one pair of imaging units provided on respective sides in a width direction of the container film at such positions that the pocket portion is placed between the imaging units; and a determination process of determining whether there is any pinhole or not in at least the pocket portion, based on the images taken in the imaging process. An upstream-side position denotes a position that causes images of at least an upstream-side lateral wall portion that is included in the lateral wall portion and that is located on an upstream side along a conveying direction of the container film, to be taken with the pair of imaging units; a middle-side position denotes a position that causes images of at least the bottom wall portion and front-side lateral wall portions that are included in the lateral wall portion and that are directly opposed to the imaging units in the width direction of the container film, to be taken with the pair of imaging units; and a downstream-side position denotes a position that causes images of at least a downstream-side lateral wall portion that is included in the lateral wall portion and that is located on a downstream side along the conveying direction of the container film, to be taken with the pair of imaging units. The imaging process takes images of at least the pocket portion with the pair of imaging units, when the pocket portion is located at the upstream-side position, when the pocket portion is located at the middle-side position, and when the pocket portion is located at the downstream-side position. The determination process determines whether there is any pinhole or not in at least the pocket portion, based on a plurality of images that are taken in the imaging process and that include information with regard to the downstream-side lateral wall portion, the front-side lateral wall portions, the upstream-side lateral wall portion, and the bottom wall portion.

The configuration of Aspect 6 has similar functions and advantageous effects to those of Aspect 1 described above.

DETAILED DESCRIPTION OF EMBODIMENTS

The following describes embodiments with reference to drawings. The configuration of a PTP sheet as a "packaging sheet" is described first.

Figure 1:
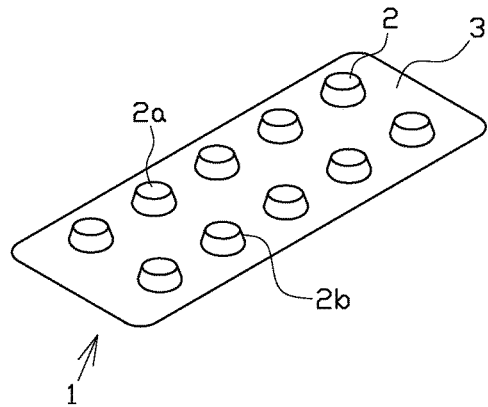
FIG. 1 is a perspective view illustrating a PTP sheet.
Figure 2:
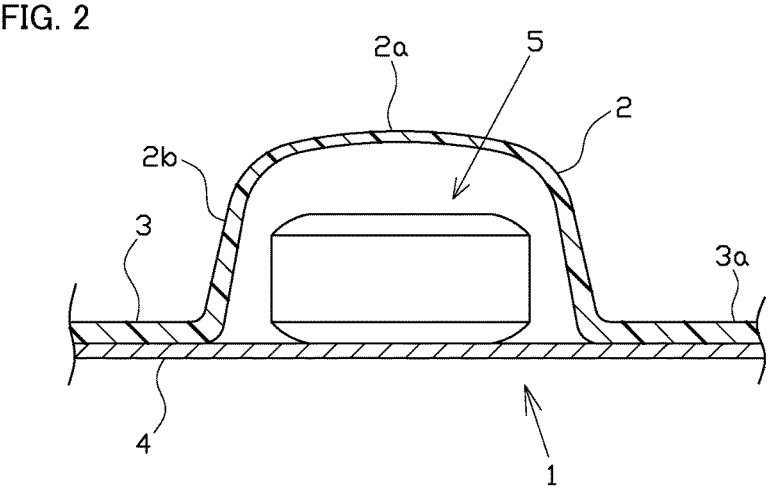
FIG. 2 is a partly enlarged sectional view illustrating a pocket portion of the PTP sheet.

As shown in FIG. 1 and FIG. 2, a PTP sheet 1 includes a container film 3 provided to have a plurality of pocket portions 2, and a cover film 4 mounted to the container film 3 such as to close the respective pocket portions 2.

The container film 3 of one or more embodiments is made of a transparent or translucent thermoplastic resin material, such as PP (polypropylene) or PVC (polyvinyl chloride), and has translucency. The container film 3 includes a flat flange portion 3a that is extended and formed outward from opening-side ends of the respective pocket portions 2 and that is an object which the cover film 4 is mounted to. The pocket portion 2 includes a bottom wall portion 2a that is formed in a disk-like shape to be approximately parallel to the flange portion 3a, and a ring-shaped lateral wall portion 2b that is formed to connect with an outer circumferential part of the bottom wall portion 2a and with the flange portion 3a.

The cover film 4 is, on the other hand, made of an opaque material (for example, aluminum foil) with a sealant made of, for example, a polypropylene resin, provided on a surface thereof.

Figure 3:
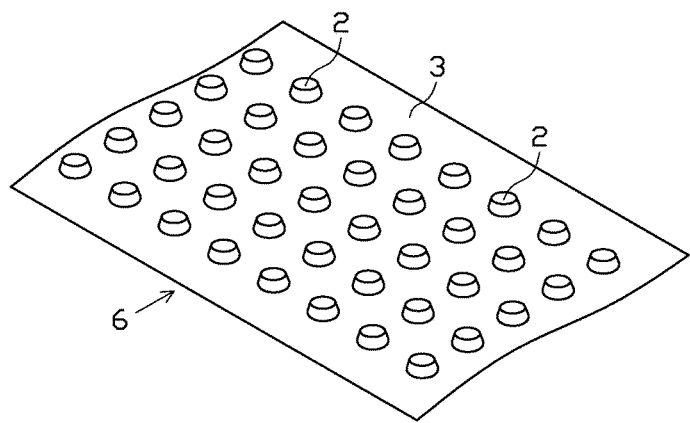
FIG. 3 is a perspective view illustrating a PTP film.

The PTP sheet 1 is manufactured by punching sheets from a PTP film 6 in a belt-like form as a "packaging film" (shown in FIG. 3), which is comprised of the container film 3 in a belt-like form and the cover film 4 in a belt-like form, and is formed in an approximately rectangular shape in plan view.

In the PTP sheet 1, two pocket arrays are formed along a sheet short side direction, and each pocket array includes five pocket portions 2 arranged along a sheet longitudinal direction. Accordingly, a total of ten pocket portions 2 are formed in the PTP sheet 1. One tablet 5 as a "content" is placed in each of the pocket portions 2.

The following describes the general configuration of a PTP packaging machine 10 used to manufacture the PTP sheet 1 described above. According to one or more embodiments, the PTP packaging machine 10 corresponds to the "packaging sheet manufacturing apparatus".

Figure 4:
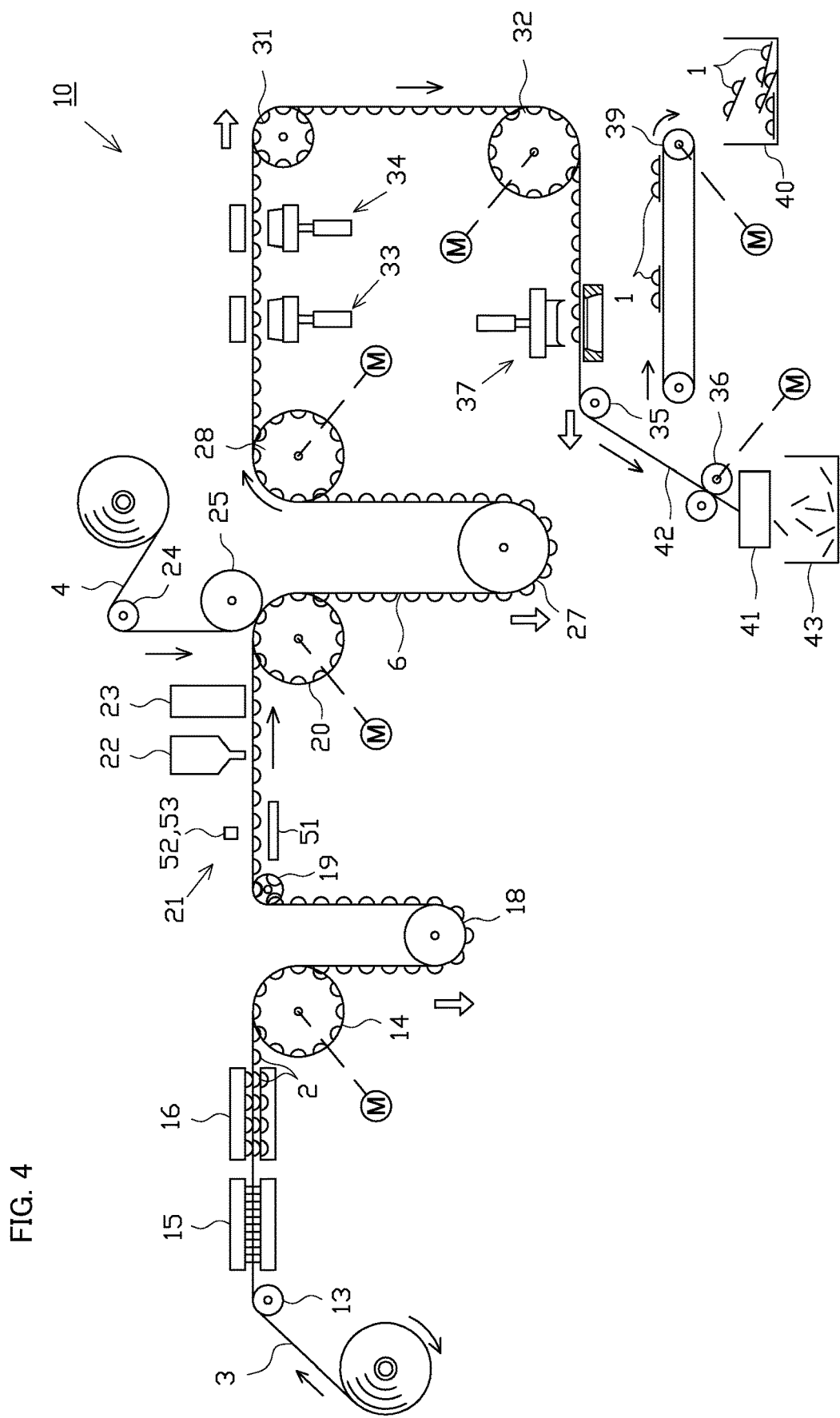
FIG. 4 is a schematic diagram illustrating a PTP packaging machine.

As shown in FIG. 4, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed between the guide roll 13 and the intermittent feed roll 14 along the conveyance path of the container film 3. In the state that the container film 3 is heated to be relatively soft by the heating device 15, the plurality of pocket portions 2 are formed at predetermined positions in the container film 3 by the pocket portion forming device 16. Formation of the pocket portions 2 is performed during an interval between conveying operations of the container film 3 by the intermittent feed roll 14. The container film 3 processed through the pocket portion forming device 16 has a plurality of rows (five rows according to one or more embodiments), which are arrayed in a width direction of the container film 3, of the pocket portions 2 that are arrayed in a conveying direction of the container film 3.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

An inspection device 21, a filling device 22 and a post-filling inspection device 23 are sequentially placed between the guide roll 19 and the film receiving roll 20 along the conveying path of the container film 3.

The inspection device 21 is configured to check for the presence of any pinhole (i.e., any micro hole pierced through the container film 3) in at least the pocket portions 2 of the container film 3, after formation of the pocket portions 2. The details of the inspection device 21 will be described later.

The filling device 23 serves to fill the pocket portions 2 with the tablets 5. The post-filling inspection device 23 is configured to check, for example, whether the tablet 5 is certainly placed in each of the pocket portions 2, whether the tablet 5 has any abnormality, and whether each of the pocket portions 2 has any foreign substance.

A film roll of the belt-like cover film 4 is also wound in a roll form on a most upstream side. A pullout end of the cover film 4 wound in the roll form is guided by a guide roll 24 toward a heating roll 25.

The heating roll 25 is pressed against to be in contact with the film receiving roll 20 described above. The container film 3 and the cover film 4 are fed into between these two rolls 20 and 25. The container film 3 and the cover film 4 pass through between these two rolls 20 and 25 in the heated and pressed contact state, so that the cover film 4 is mounted to the container film 3 such as to close the respective pocket portions 2. This series of operations manufactures the belt-like PTP film 6 that has the pocket portions 2 respectively filled with the tablets 5.

The PTP film 6 fed from the film receiving roll 20 is sequentially laid on a tension roll 27 and an intermittent feed roll 28 in this order. The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed between the intermittent feed roll 28 and the tension roll 31 along the conveyance path of the PTP film 6. The slit formation device 33 serves to form a cutting slit at predetermined positions of the PTP film 6. The stamping device 34 serves to stamp a mark at predetermined positions of the PTP film 6 (for example, in tag portions). The cutting slits and the marks are omitted from the illustrations of FIG. 1 and other drawings.

The PTP film 6 fed from the intermittent feed roll 32 is sequentially laid on a tension roll 35 and a continuous feed roll 36 in this order on a downstream side of the intermittent feed roll 32. A sheet punching device 37 is placed between the intermittent feed roll 32 and the tension roll 35 along the conveyance path of the PTP film 6. The sheet punching device 37 serves to punch out the outer periphery of each unit of PTP sheet 1 from the PTP film 6.

The respective PTP sheets 1 punched out by the sheet punching device 37 are conveyed by a conveyor 39 and are temporarily accumulated in a finished product hopper 40. When a PTP sheet 1 is determined as defective by the inspection device 22 or by the post-filling inspection device 23, however, this PTP sheet 1 determined as defective is not conveyed to the finished product hopper 40 but is separately discharged by a non-illustrated defective sheet discharge mechanism.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. The cutting device 41 is configured to cut the unrequired film portion 42 into predetermined dimension. The cut pieces of the unrequired film portion 42 (scraps) are accumulated in a scrap hopper 43 and are then disposed separately.

Figure 5:
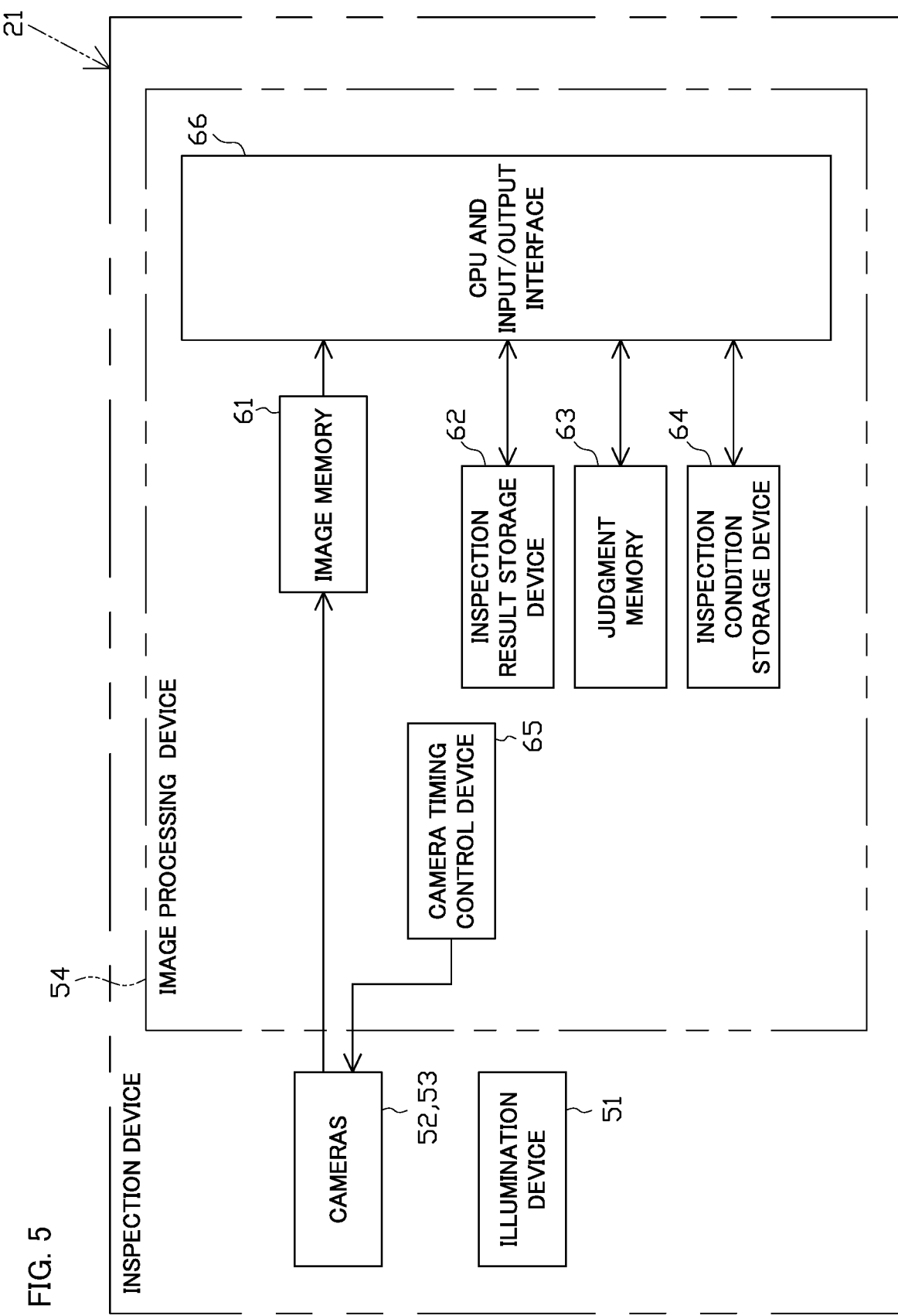
FIG. 5 is a block diagram illustrating the electrical configuration of an inspection device.
Figure 6:
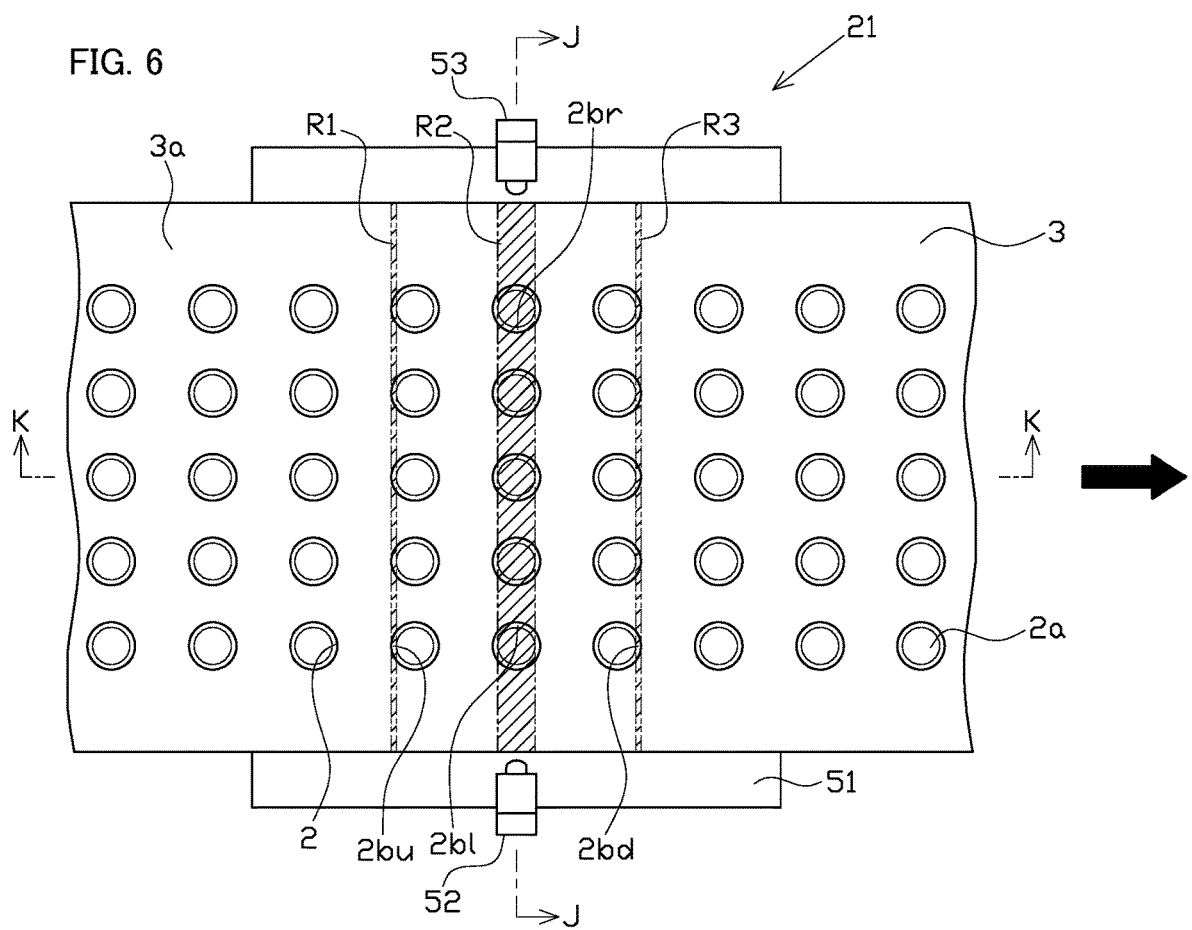
FIG. 6 is a schematic diagram when a container film, cameras and others are viewed along a direction perpendicular to the container film.

The following describes the inspection device 21. As shown in FIG. 5 and FIG. 6, the inspection device 21 includes an illumination device 51, cameras 52 and 53 and an image processing device 54. The inspection device 21 may be provided with a display unit configured to display information stored in the image processing device 54 and with an input unit (for example, a keyboard) configured to input information into the image processing device 54. According to one or more embodiments, the illumination device 51 configures the "irradiation unit" or "irradiator"; each of the cameras 52 and 53 configures the "imaging unit" or "imaging device" and the image processing device 54 configures the "determination unit" or "processor".

Figure 8:
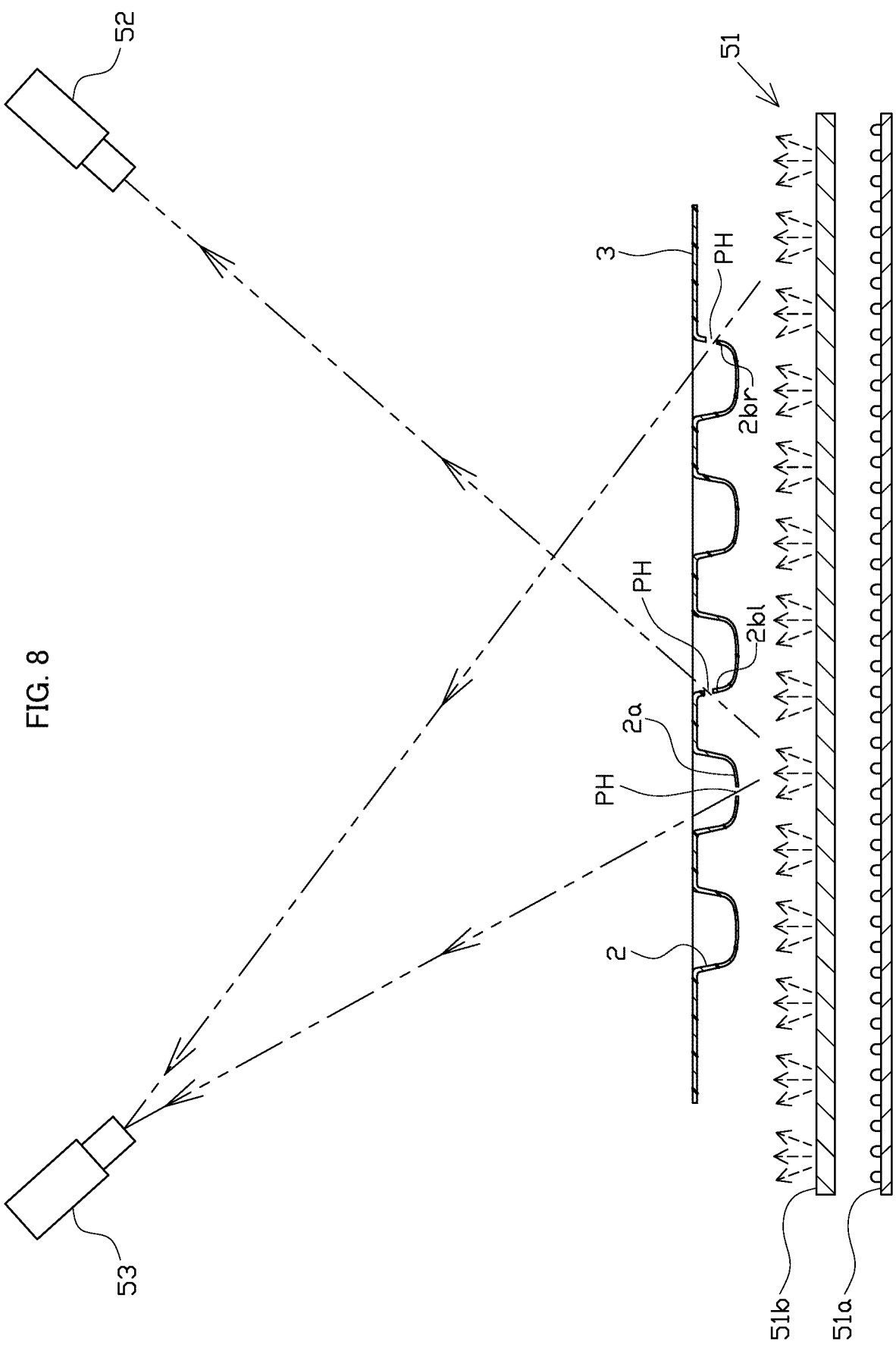
FIG. 8 is a schematic sectional view taken on a line J-J in FIG. 6.
Figure 9:
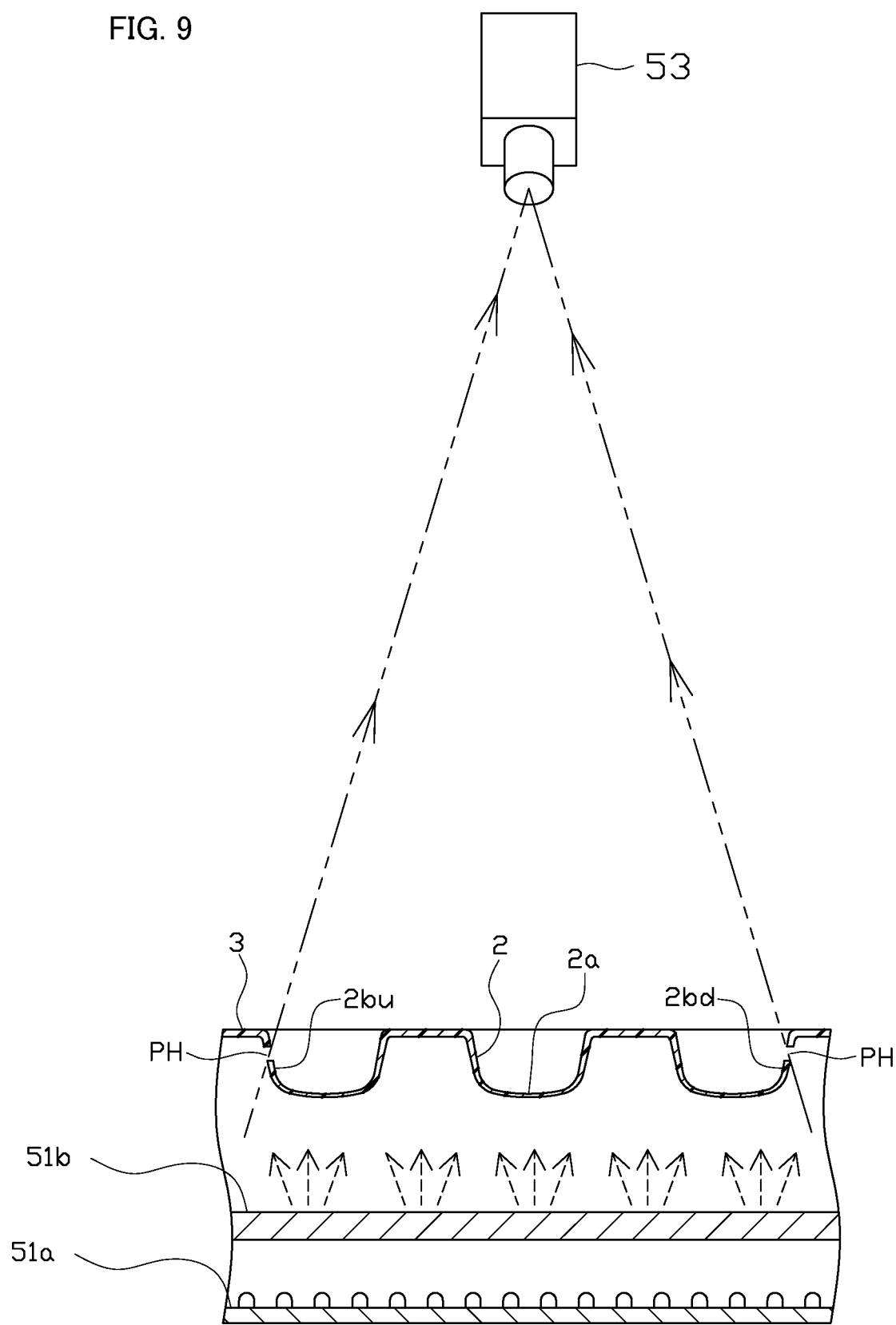
FIG. 9 is an enlarged schematic sectional view taken on a line K-K in FIG. 6.

As shown in FIG. 8 and FIG. 9, the illumination device 51 is placed on a protruding side of the pocket portions 2 of the container film 3. The illumination device 51 includes an LED mounting board 51a and a diffusion plate 51b provided to cover the LED mounting substrate 51a and is configured to allow for surface emission.

The LED mounting board 51a includes a large number of LEDs serving as a light source that is capable of radiating ultraviolet light (ultraviolet rays). According to one or more embodiments, the ultraviolet light used is light having a peak wavelength in a range of 365 nm to 500 nm (or more preferably in a range of 365 nm to 420 nm). The ultraviolet light radiating from the LED mounting board 51a is diffused by the diffusion plate 51b, and the diffused ultraviolet light radiates toward one face of the container film 3. According to one or more embodiments, a process of irradiating the container film 3 with the ultraviolet light by the illumination device 51 corresponds to the "irradiating process". The illumination device 51 may not be provided with the diffusion plate 51b. The illumination device 51 may be provided with a coverage unit that is configured to prevent the ultraviolet light radiating from the illumination device 51, from directly reaching the camera 52 or 53.

The cameras 52 and 53 are placed on an opening side of the pocket portions 2 of the container film 3 and are configured by cameras having sensitivity to at least ultraviolet light (for example, CCD cameras or CMOS cameras). The cameras 52 and 53 take images of the container film 3 (or more specifically, images of the ultraviolet light passing through the container film 3) from the other face side of the container film 3. Imaging data (image data) obtained by the cameras 52 and 53 are input into the image processing device 54. According to one or more embodiments, a process of taking images of the container film 3 including the pocket portions 2 by the cameras 52 and 53 corresponds to the "imaging process".

Furthermore, the cameras 52 and 53 are provided on respective sides in the width direction of the container film 3 at such positions that all (five in the illustrated example) pocket portions 2 of the container film 3 are placed between the cameras 52 and 53 (as shown in FIG. 6 and FIG. 8). More specifically, according to one or more embodiments, the cameras 52 and 53 are provided on the respective sides in the width direction of the container film 3 at such positions that the full width range of the container film 3 is placed between the cameras 52 and 53.

Moreover, according to one or more embodiments, only the pair of cameras 52 and 53 are provided, as cameras configured to take images of the container film 3, in the inspection device 21.

Referring back to FIG. 5, the image processing device 54 determines whether there is any pinhole or not in at least the pocket portions 2 of the container film 3, based on images taken by the cameras 52 and 53. The image processing device 54 is configured as a computer system including, for example, a CPU serving as an arithmetic device, a ROM configured to store various programs, and a RAM configured to temporarily store various data, such as calculation data and input/output data. The image processing device 54 includes an image memory 61, an inspection result storage device 62, a judgment memory 63, an inspection condition storage device 64, a camera timing control device 65 and a CPU and input-output interface 66.

The image memory 61 stores images taken by and input from the respective cameras 52 and 53. An inspection is performed for the presence of any pinhole, based on the taken images stored in this image memory 61. The images may be subjected to processing when the inspection is performed. Such processing may include, for example, a masking process and shading correction. Binarized images obtained by a binarization process of the taken images and masking images obtained by the masking process are also stored into the image memory 61.

The inspection result storage device 62 stores data on good/poor quality judgment results and statistical data obtained by statistically processing the data on good/poor quality judgment results.

The judgment memory 63 stores various information used for the inspection. The various information includes a program used to determine whether there is any pinhole or not and a variety of numerical values for judgment used as criteria of good/poor quality judgment. According to one or more embodiments, a luminance threshold value, an area reference value and the like are stored as the numerical values for judgment. The luminance threshold value is used to extract a high luminance area where a pinhole is likely to be present. The area reference value is used to determine whether or not the high luminance area corresponds to a pinhole. According to one or more embodiments, appropriate numerical values computed in advance are stored respectively as the luminance threshold value and the area reference value.

The inspection condition storage device 64 stores date and time of each defective determination, inspection conditions used for inspection, and the like.

The camera timing control device 65 controls imaging timing of the cameras 52 and 53. More specifically, the camera timing control device 65 controls the imaging timings of the cameras 52 and 53, such as to take images of at least the pocket portions 2 at respective times when the pocket portions 2 are located at an upstream-side position R1, when the pocket portions 2 are located at a middle-side position R2, and when the pocket portions 2 are located at a downstream-side position R3. The imaging timings of the cameras 52 and 53 are controlled, based on signals from an encoder (not shown) that is provided in the PTP packaging machine 10 and that is configured to obtain a feed amount of the container film 3.

Figure 7:
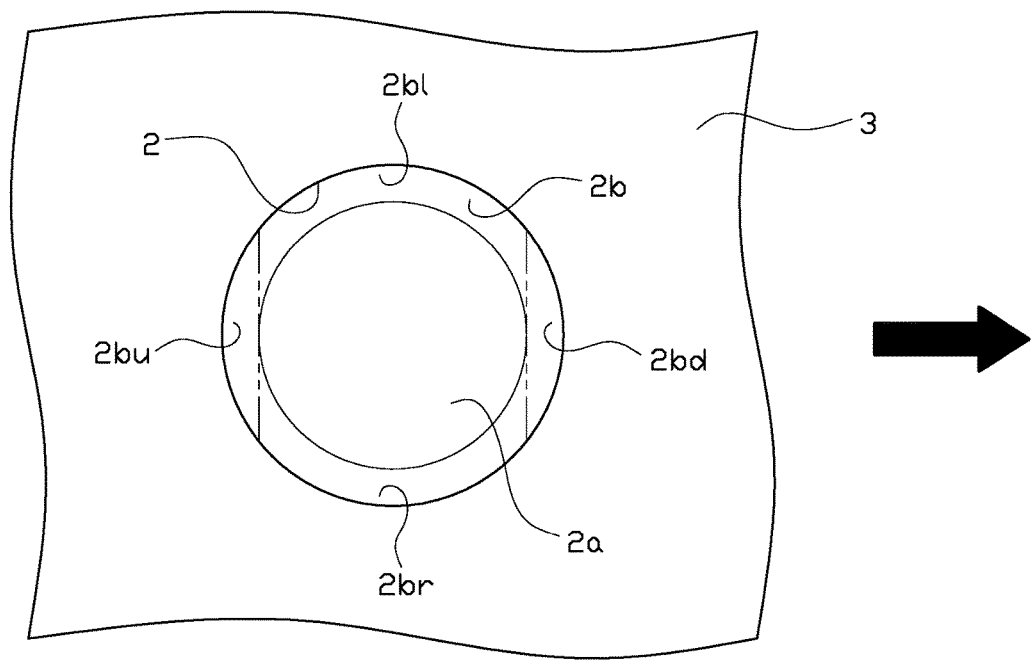
FIG. 7 is an enlarged schematic plan view illustrating a pocket portion to explain an upstream-side lateral wall portion, front-side lateral wall portions and a downstream-side lateral wall portion.

The following describes the upstream-side position R1, the middle-side position R2 and the downstream-side position R3. As shown in FIG. 7, part of the lateral wall portion 2b of the pocket portion 2 that is located on an upstream side along the conveying direction of the container film 3 (direction shown by a filled arrow in FIG. 7) is referred to as an upstream-side lateral wall portion 2bu, and part of the lateral wall portion 2b that is located on a downstream side along the conveying direction is referred to as a downstream-side lateral wall portion 2*bd*. Parts of the lateral wall portion 2*b* that are located between the upstream-side lateral wall portion 2*bu* and the downstream-side lateral wall portion 2*bd* and that are opposed to the cameras 52 and 53 in the width direction of the container film 3 are referred to as a first front-side lateral wall portion 2*bl* and a second front-side lateral wall portion 2*br* (as shown in FIG. 6). According to one or more embodiments, the part of the lateral wall portion 2*b* opposed to the camera 52 is referred to as the first front-side lateral wall portion 2*bl*, and the part of the lateral wall portion 2*b* opposed to the camera 53 is referred to as the second front-side lateral wall portion 2*br*. Each of the first front-side lateral wall portion 2*bl* and the second front-side lateral wall portion 2*br* corresponds to the "front-side lateral wall portion".

As shown in FIG. 6, the upstream-side position R1 denotes a position that is located upstream of a placement position of the cameras 52 and 53 (more specifically, a lens optical axis of the cameras 52 and 53) along the conveying direction of the container film 3 (direction shown by a filled arrow in FIG. 6) and that allows images of the upstream-side lateral wall portions 2*bu* to be taken by the cameras 52 and 53.

The middle-side position R2 denotes a position that is located between the two cameras 52 and 53 and that allows images of the bottom wall portion 2*a* and the two front-side lateral wall portions 2*bl* and 2*br* to be taken by the cameras 52 and 53. According to one or more embodiments, the respective pocket portions 2 located at the middle-side position R2 are imaged with the cameras 52 and 53. More specifically, an image of the bottom wall portion 2*a* and the first front-side lateral wall portion 2*bl* of each of the pocket portions 2 is taken with the camera 52, and an image of the bottom wall portion 2*a* and the second front-side lateral wall portion 2*br* of each of the pocket portions 2 is taken with the camera 53.

Furthermore, the downstream-side position R3 denotes a position that is located downstream of the placement position of the cameras 52 and 53 along the conveying direction of the container film 3 and that allows images of the downstream-side lateral wall portions 2*bd* to be taken by the cameras 52 and 53.

At least the upstream-side position R1 and the downstream-side position R3 may be any positions that allow images of the upstream-side lateral wall portions 2*bu* and the downstream-side lateral wall portions 2*bd* to be taken by the cameras 52 and 53. These positions R1 and R3 may be adjusted and changed according to, for example, inspection conditions. According to one or more embodiments, however, the respective positions R1, R2 and R3 are set, such that images of the pocket portions 2 located at the upstream-side position R1, the pocket portions 2 located at the middle-side position R2 and the pocket portions 2 located at the downstream-side position R3 are taken simultaneously by one single imaging operation with the cameras 52 and 53.

Figure 10:
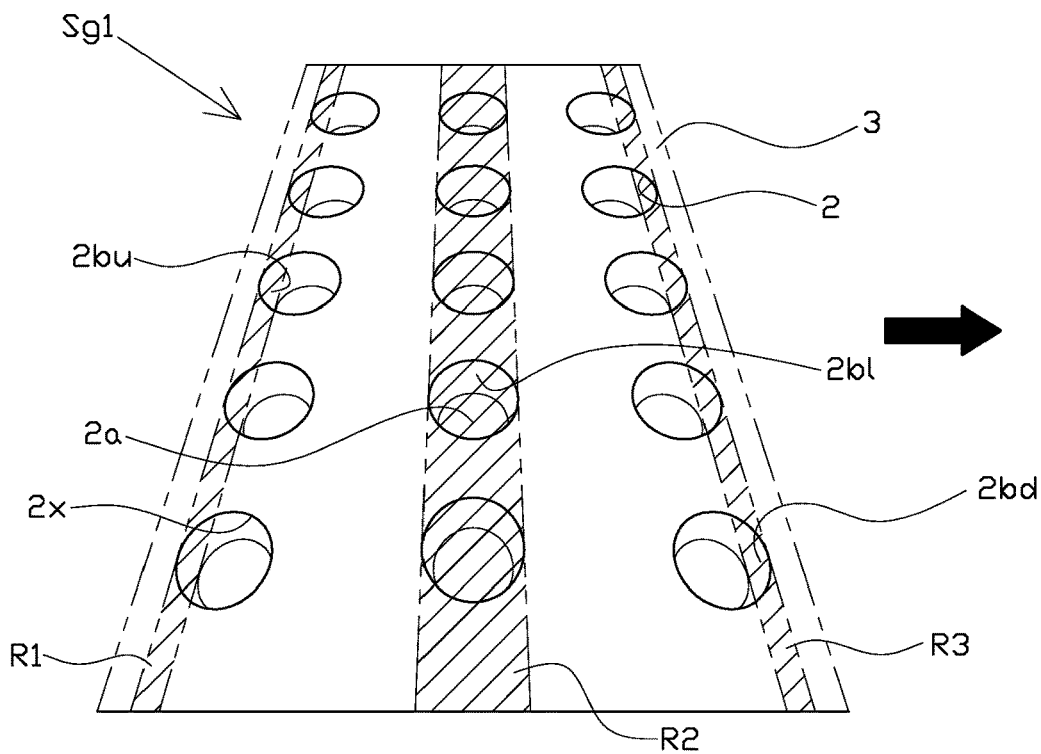
FIG. 10 is a schematic diagram illustrating part of an image taken and obtained by one camera.
Figure 11:
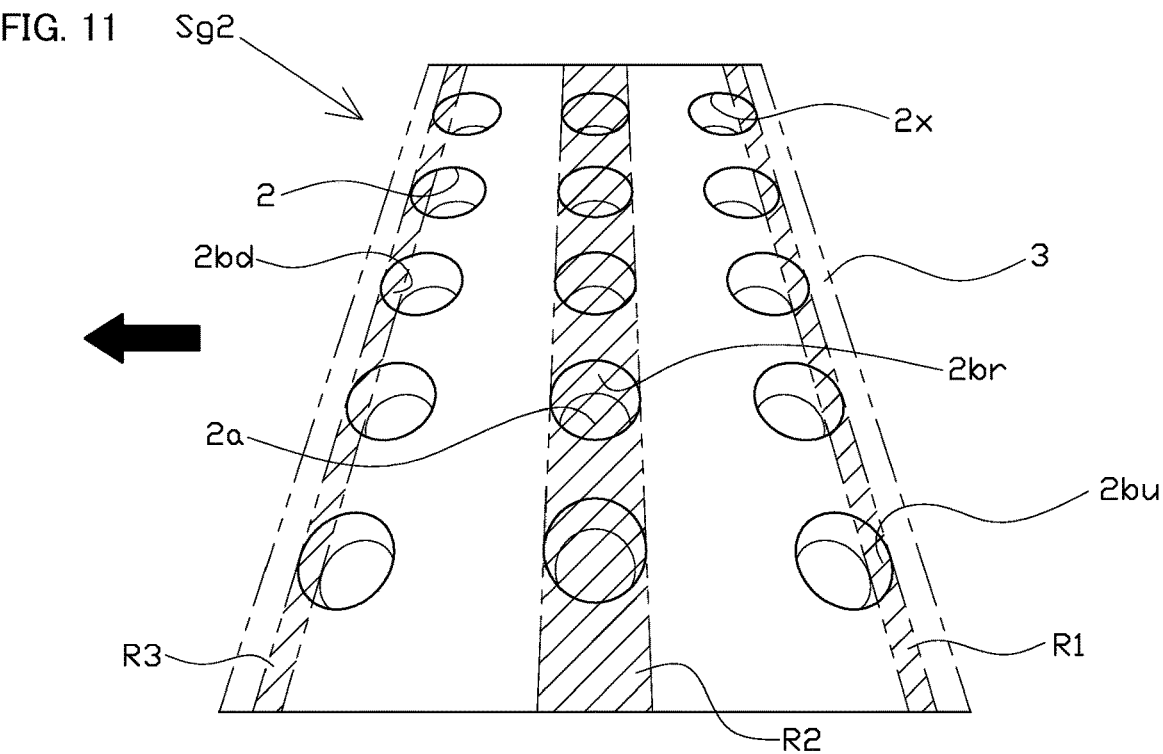
FIG. 11 is a schematic diagram illustrating part of an image taken and obtained by the other camera.

Additionally, as shown in FIG. 10 and FIG. 11, images Sg1 and Sg2 are taken and obtained by the cameras 52 and 53. The image Sg1 taken and obtained by the camera 52 includes information with regard to at least the upstream-side lateral wall portions 2*bu* of all the (five in the illustrated example) pocket portions 2 located at the upstream-side position R1, the bottom wall portions 2*a* and the first front-side lateral wall portions 2*bl* of all the (five in the illustrated example) pocket portions 2 located at the middle-side position R2, and the downstream-side lateral wall portions 2*bd* of all the (five in the illustrated example) pocket portions 2 located at the downstream-side position R3 (as shown in FIG. 10). The image Sg2 taken and obtained by the camera 53, on the other hand, includes information with regard to at least the upstream-side lateral wall portions 2*bu* of all the pocket portions 2 located at the upstream-side position R1, the bottom wall portions 2*a* and the second front-side lateral wall portions 2*br* of all the pocket portions 2 located at the middle-side position R2, and the downstream-side lateral wall portions 2*bd* of all the pocket portions 2 located at the downstream-side position R3 (as shown in FIG. 11). FIG. 10 and FIG. 11 also show the conveying direction of the container film 3 (directions of filled arrows) and the respective positions R1, R2 and R3.

Furthermore, imaging with the cameras 52 and 53 is performed every time the pocket portions 2 reach each of the positions R1, R2 and R3. Accordingly, at least three images Sgt and three images Sg2 with regard to one pocket portion 2 (including imaging of one pocket portion 2) are taken and obtained by the cameras 52 and 53. A total of at least six images S1 and Sg2 are thus obtained with regard to one pocket portion 2.

Figure 12:
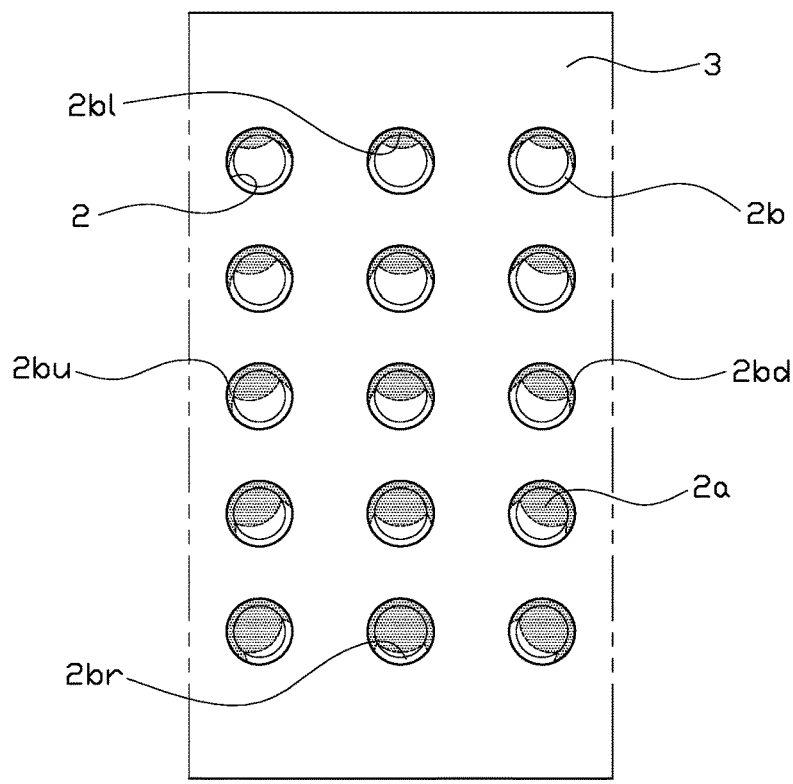
FIG. 12 is a diagram illustrating a planar imaging range of pocket portions with one camera.
Figure 13:
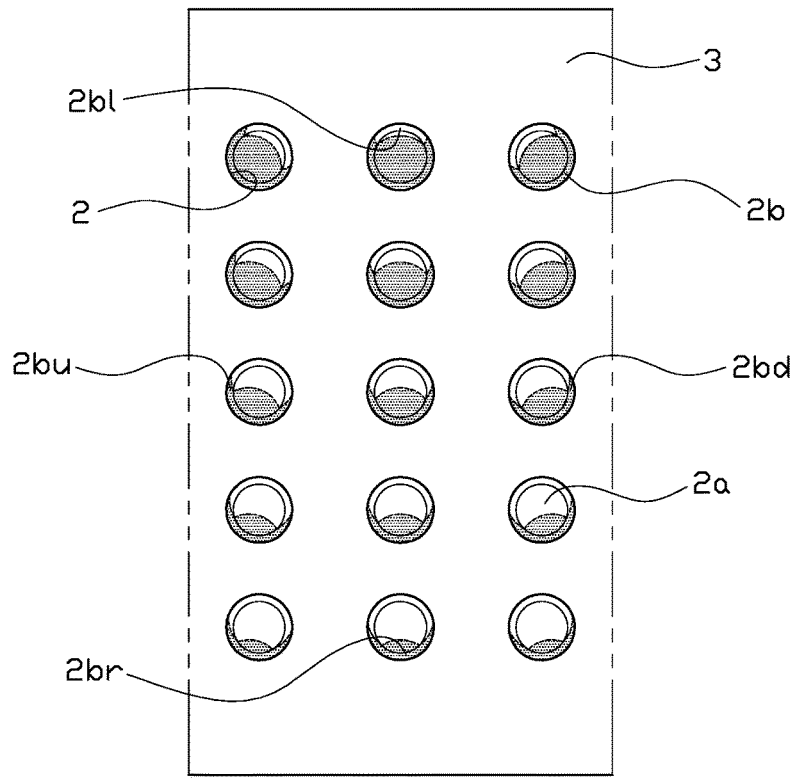
FIG. 13 is a diagram illustrating a planar imaging range of pocket portions with the other camera.

According to one or more embodiments, for example, planar ranges of the pocket portions 2 imaged by the camera 52 are areas filled with a dotted pattern shown in FIG. 12, and planar ranges of the pocket portions 2 imaged by the camera 53 are areas filled with a dotted pattern shown in FIG. 13. According to one or more embodiments, the entire area of the bottom wall portions 2*a* of the pocket portions 2 located at the middle-side position R2 is covered by the two images Sg1 and Sg2 that are obtained by imaging the pocket portions 2 located at the middle-side position R2. Additionally, at least the entire area of one pocket portion 2 is covered by the total of six images Sg1 and Sg2 with regard to the one pocket portion 2.

The CPU and input/output interface 66 (shown in FIG. 5) has a function of inputting and outputting the images Sg1 and Sg2 and various data such as the good/poor quality judgment results and a function of performing various programs. The CPU and input/output interface 66 determines whether there is any pinhole or not in at least the pocket portions 2 by using the information stored in the judgment memory 63 and the input images Sg1 and Sg2.

A procedure described below is applied to determine whether there is any pinhole or not. The ultraviolet rays passing through pinholes PH directly reach the cameras 52 and 53 (as shown in FIG. 8 and FIG. 9). The procedure first processes the obtained images Sg1 and Sg2 by a binarization process using the luminance threshold value described above, so as to obtain a binarized image that includes a high luminance area having a value "1" (light area) where a pinhole PH is likely to be present and a residual area having a value "0" (dark area). The procedure subsequently processes the obtained binarized image by a masking process and sets an area occupied by the pocket portions 2 in the binarized image as an inspection object. The masking process may be performed in such a manner that the inspection object additionally includes an entire area or a partial area of the flange portion 3*a*.

The procedure subsequently processes the binarized image by lump processing. The lump processing includes a process of specifying a linkage component (lump portion) of the area having the value "1" (light area) in the binarized image and a process of calculating the area of the lump portion. The area of the lump portion is expressed by the number of dots corresponding to the pixels of the cameras 52 and 53.

The procedure subsequently compares the calculated area of the lump portion with the area reference value described above. When the area of the lump portion is equal to or larger than the area reference value, the procedure determines that "there is any pinhole" and determines that the PTP sheet 1 expected to eventually have any pinhole H, as a defective product. When the area of the lump portion is smaller than the area reference value, on the other hand, the procedure determines that "there is no pinhole". According to one or more embodiments, the process of determining whether there is any pinhole or not as described above corresponds to the "determination process". The procedure of determining whether there is any pinhole or not described above is only illustrative and may be altered or replaced appropriately.

Figure 14:
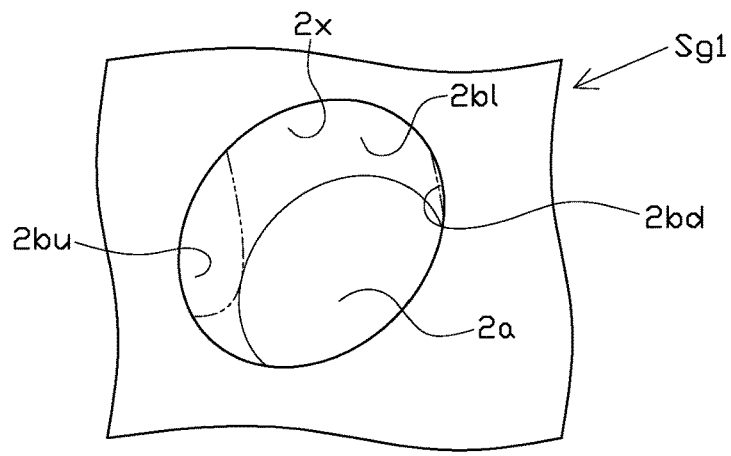
FIG. 14 is a schematic diagram illustrating a part corresponding to a pocket portion in an image taken and obtained by one camera when the pocket portion is located at an upstream-side position.
Figure 15:
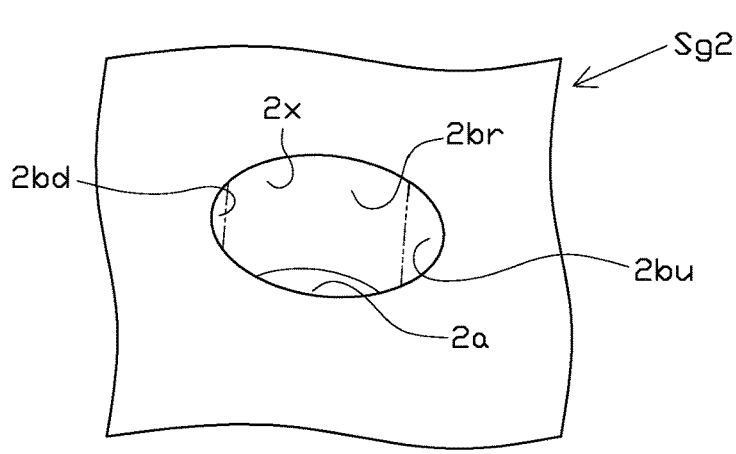
FIG. 15 is a schematic diagram illustrating a part corresponding to a pocket portion in an image taken and obtained by the other camera when the pocket portion is located at the upstream-side position.
Figure 16:
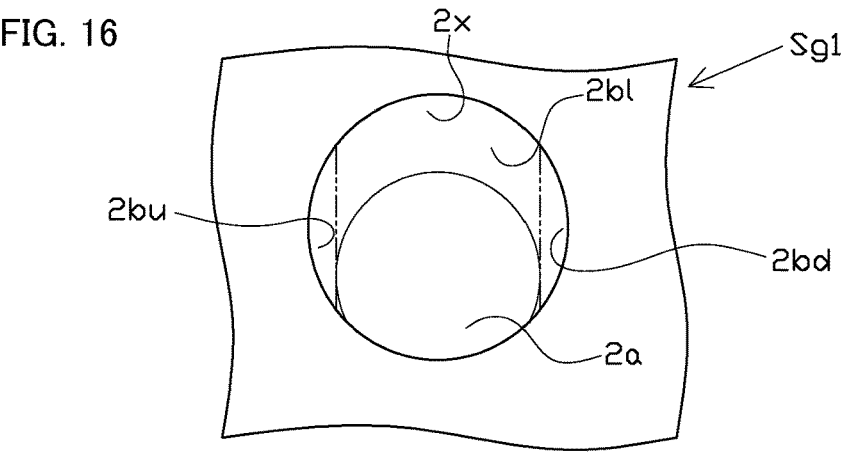
FIG. 16 is a schematic diagram illustrating a part corresponding to a pocket portion in an image taken and obtained by one camera when the pocket portion is located at a middle-side position.
Figure 17:
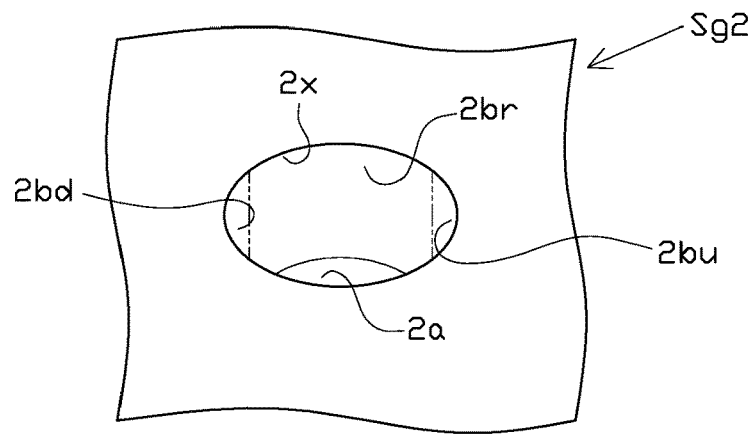
FIG. 17 is a schematic diagram illustrating a part corresponding to a pocket portion in an image taken and obtained by the other camera when the pocket portion is located at the middle-side position.
Figure 18:
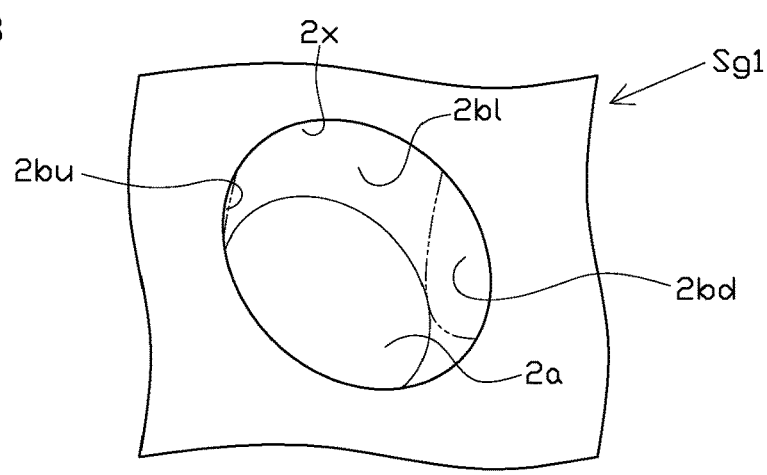
FIG. 18 is a schematic diagram illustrating a part corresponding to a pocket portion in an image taken and obtained by one camera when the pocket portion is located at a downstream-side position.
Figure 19:
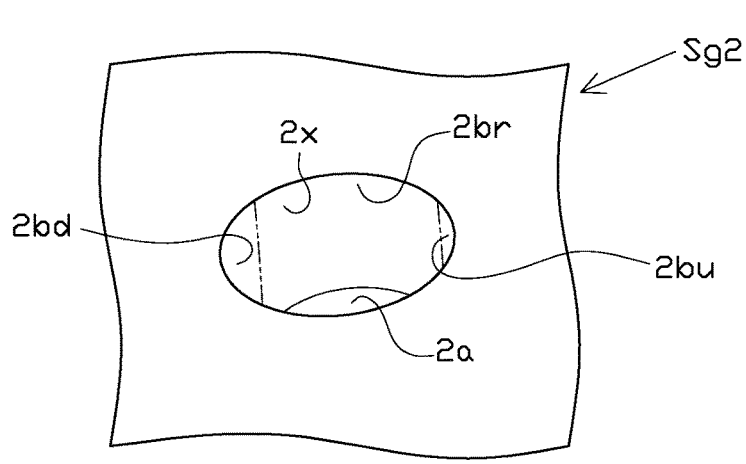
FIG. 19 is a schematic diagram illustrating a part corresponding to a pocket portion in an image taken and obtained by the other camera when the pocket portion is located at the downstream-side position.

The determination process described above is performed with regard to all the obtained images Sg1 and Sg2. As a result, the determination process determines whether there is any pinhole or not in the pocket portion 2, based on parts corresponding to the pocket portion 2 in at least the total of six images Sg1 and Sg2. For example, the determination process determines whether there is any pinhole or not in one pocket portion 2x among a plurality of pocket portions 2 (shown in FIG. 10 and FIG. 11), based on parts corresponding to the pocket portion 2x in the images Sg1 and Sg2 taken when the pocket portion 2x is located at the upstream-side position R1 (shown in FIG. 14 and FIG. 15), parts corresponding to the pocket portion 2x in the images Sg1 and Sg2 taken when the pocket portion 2x is located at the middle-side position R2 (shown in FIG. 16 and FIG. 17) and parts corresponding to the pocket portion 2x in the images Sg1 and Sg2 taken when the pocket portion 2x is located at the downstream-side position R3 (shown in FIG. 18 and FIG. 19).

As described above in detail, according to one or more embodiments, the cameras 52 and 53 take images of at least the upstream-side lateral wall portion 2bu of the pocket portion 2 when the pocket portion 2 is located at the upstream-side position R1, take images of at least the front-side lateral wall portions 2bl and 2br of the pocket portion 2 when the pocket portion 2 is located at the middle-side position R2, and take images of at least the downstream-side lateral wall portion 2bd of the pocket portion 2 when the pocket portion 2 is located at the downstream-side position R3. In other words, in the case where the container film 3 and the cameras 52 and 53 are viewed along a direction perpendicular to the container film 3 (in the case where the container film 3 and others are viewed like FIG. 6), the cameras 52 and 53 take images of the respective lateral wall portions 2bd, 2bl, 2br and 2bu as imaging objects, when the direction of a vector from a pocket portion 2 to the camera 52 or 53 (more specifically, to the camera 52 or 53 closer to the pocket portion 2) (in other words, the traveling direction of light from the pocket portion 2 toward the camera 52 or 53) becomes more parallel to the thickness direction of each of the lateral wall portions 2bd, 2bl, 2br and 2bu as the imaging object and the camera 52 or 53 comes closer to such a state that the camera 52 or 53 is more directly opposed to each of the lateral wall portions 2bd, 2bl, 2br and 2bu of the pocket portion 2. Accordingly, when there is any pinhole in the lateral wall portion 2b, the ultraviolet ray passing through the pinhole is more likely to reach the camera 52 or 53. This configuration thus enables any pinhole that is present in the lateral wall portion 2b to be more distinct in the images Sgt and Sg2.

The cameras 52 and 53 are also configured to take images of the bottom wall portions 2a of the respective pocket portions 2 located at the middle-side position R2. In other words, the cameras 52 and 53 are placed at positions sufficiently away from the container film 3 along the direction perpendicular to the container film 3. Accordingly, in the case where the container film 3 and the cameras 52 and 53 are viewed along the conveying direction of the container film 3 (in the case where the container film 3 and others are viewed like FIG. 8), the cameras 52 and 53 take images of the bottom wall portion 2a, when the direction of a vector from a pocket portion 2 to the camera 52 or 53 (more specifically, to the camera 52 or 53 closer to the pocket portion 2) (in other words, the traveling direction of light from the pocket portion 2 toward the camera 52 or 53) becomes more parallel to the thickness direction of the bottom wall portion 2a as an imaging object and the camera 52 or 53 comes closer to such a state that the camera 52 or 53 is more directly opposed to the bottom wall portion 2a of the pocket portion 2. Additionally, according to one or more embodiments, the cameras 52 and 53 take images of the bottom wall portion 2a, when a pocket portion 2 is located at the middle-side position R2, in other words, when the bottom wall portion 2a of the pocket portion 2 comes closest to the camera 52 or 53. As a result, when there is any pinhole in the bottom wall portion 2a, the ultraviolet ray passing through the pinhole is more likely to reach the camera 52 or 53. This configuration thus enables any pinhole that is present in the bottom wall portion 2a to be more distinct in the images Sg1 and Sg2.

Furthermore, one pair of cameras 52 and 53 are provided on the respective sides in the width direction of the container film 3 at such positions that the pocket portions 2 are placed between the cameras 52 and 53. This configuration enables part of a pocket portion 2 that is not imaged by one camera 52 (53) to be imaged by the other camera 53 (52). Accordingly, this configuration enables the images Sg1 and Sg2 with regard to the entire area of the pocket portion 2 to be taken more reliably.

As described above, the configuration of one or more embodiments enables any pinhole that is present in the pocket portion 2 to be more distinct in the images Sg1 and Sg2, while enabling the images Sg1 and Sg2 with regard to the entire area of the pocket portion 2 to be taken and obtained more reliably. As a result, this configuration achieves the extremely high detection accuracy for any pinhole in the pocket portion 2.

Moreover, the inspection device 21 is provided with only one pair of cameras 52 and 53. This effectively achieves simplification and size reduction of the inspection device 21, as well as reduction of the costs with regard to manufacture, maintenance and others of the inspection device 21.

Additionally, the images of the pocket portions 2 located at the upstream-side position R1, the pocket portions 2 located at the middle-side position R2 and the pocket portions 2 located at the downstream-side position R3 are taken simultaneously by one single imaging operation with the respective cameras 52 and 53. This configuration enables the images Sg1 and Sg2 required for the inspection to be taken and obtained by a less number of imaging operations and enhances the inspection efficiency.

Furthermore, according to one or more embodiments, the cameras 52 and 53 are provided on the respective sides in the width direction of the container film 3 at such positions that the container film 3 is placed between the cameras 52 and 53. Accordingly, in the case where the container film 3 and the cameras 52 and 53 are viewed along the conveying direction of the container film 3 (in the case where the container film and others are viewed like FIG. 8), the cameras 52 and 53 take images of the front-side lateral wall portions 2bl and 2br, when the direction of a vector from a pocket portion 2 to the camera 52 or 53 (more specifically, to the camera 52 or 53 closer to the pocket portion 2) (in other words, the traveling direction of light from the pocket portion 2 toward the camera 52 or 53) becomes more parallel to the thickness direction of the front-side lateral wall portions 2bl and 2br. When there is any pinhole in the front-side lateral wall portion 2bl or 2br, the ultraviolet ray passing through the pinhole is more likely to reach the camera 52 or 53. This configuration thus enables any pinhole that is present in the front-side lateral wall portion 2bl or 2br to be more distinct in the images Sg1 and Sg2. This configuration further increases the detection accuracy for any pinhole in the front-side lateral wall portions 2bl and 2br.

The present disclosure is not limited to the description of the above embodiments but may be implemented, for example, by configurations described below. The present disclosure may also be naturally implemented by applications and modifications other than those illustrated below.

Figure 20:
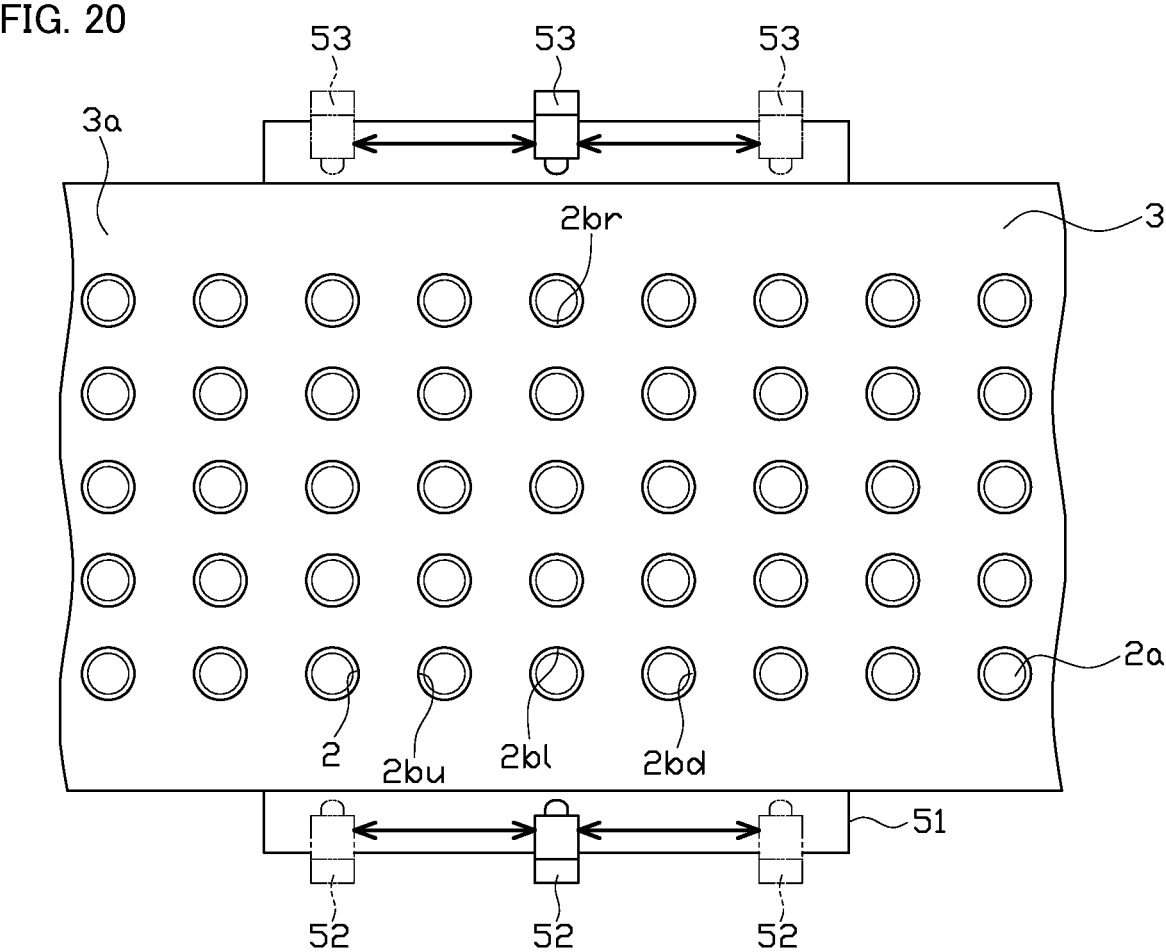
FIG. 20 is a schematic plan view illustrating movable cameras and others according to another example of one or more embodiments.

(a) The embodiments described above are configured to take images with the cameras 52 and 53 when the pocket portions 2 reach the respective positions R1, R2 and R3 in the course of continuous conveyance of the container film 3. In other words, according to the above embodiments, the cameras 52 and 53 are placed consistently at fixed positions and are configured to successively take images of the pocket portions 2 in the conveyed container film 3. According to one modification, as shown in FIG. 20, the cameras 52 and 53 may be placed to be movable along the conveying direction of the container film 3 and may be configured to be moved and successively take images of the pocket portions 2 that are located at the respective positions R1, R2 and R3 when being viewed from the cameras 52 and 53. This modified configuration may be employed to take images of the pocket portions 2 in the container film 3 that is temporarily suspended, in the case where the container film 3 is conveyed with repeating move and temporary suspension (i.e., where the container film 3 is conveyed intermittently) and where the container film 3 is moved at a high speed and it is difficult to clearly take images of the pocket portions 2 in the container film 3 during the move.

(b) The upstream-side position R1 and the downstream-side position R3 described in the above embodiments are only illustrative. According to a modification, the upstream-side position R1 may be set on a more upstream side along the conveying direction of the container film 3, and the downstream-side position R3 may be set on a more downstream side along the conveying direction. In this modification, in the case where the container film 3, the cameras 52 and 53 and others are viewed along the direction perpendicular to the container film 3, the cameras 52 and 53 may take images of the lateral wall portions 2bu and 2bd, when the direction of a vector from an upstream-side lateral wall portion 2bu or a downstream-side lateral wall portion 2bd to the camera 52 or 53 (in other words, the traveling direction of light from the lateral wall portion 2bu or 2bd toward the camera 52 or 53) becomes more parallel to the thickness direction of the lateral wall portion 2bu or 2bd. This configuration thus enables any pinhole that is present in the lateral wall portion 2bu or 2bd to be more distinct in the images Sg1 and Sg2.

Furthermore, the embodiments described above are configured to simultaneously take images of the pocket portions 2 located at the upstream-side position R1, the pocket portions 2 located at the middle-side position R2 and the pocket portions 2 located at the downstream-side position R3. According to a modification, images of these pocket portions 2 may be taken at different imaging timings. For example, images of the pocket portions 2 located at the upstream-side position R1 and the pocket portions 2 located at the downstream-side position R3 may be taken at an identical imaging timing, while images of the pocket portions 2 located at the middle-side position R2 may be taken at a different imaging timing from this identical imaging timing.

(c) According to the embodiments described above, the illumination device 51 is placed on the protruding side of the pocket portions 2, and the cameras 52 and 53 are placed on the opening side of the pocket portions 2. According to a modification, the illumination device 51 may be placed on the opening side of the pocket portions 2, and the cameras 52 and 53 may be placed on the protruding side of the pocket portions 2.

(d) According to the embodiments described above, the inspection device 21 is provided with only one pair of cameras 52 and 53, as the cameras configured to take images of the container film 3 (the pocket portions 2). According to a modification, the inspection device may be provided with three or more cameras. For example, the inspection device may be provided with two or more pairs of cameras or may be provided with one or a plurality of additional cameras separately from one pair of or two or more pairs of cameras.

(e) The embodiments described above are configured to directly take images of the bottom wall portion 2a and the lateral wall portion 2b with the cameras 52 and 53. According to a modification, a mirror, a prism and the like may be used to indirectly take images of the bottom wall portion 2a and the lateral wall portion 2b.

(f) The embodiments described above are configured to perform imaging with the cameras 52 and 53 when the pocket portions 2 reach each of the positions R1, R2 and R3 and are thus configured to perform imaging with the cameras 52 and 53 intermittently. A modification may be configured to continuously perform imaging with the cameras 52 and 53 (i.e., to perform imaging with the cameras 52 and 53 at very short intervals) and may thus be configured to perform imaging even when the pocket portions 2 are not located at the respective positions R1, R2 and R3. For example, the modification may be configured to perform imaging with the cameras 52 and 53 every time the container film 3 is conveyed by a length corresponding to one pixel width of the cameras 52 and 53.

(g) According to the embodiments described above, the container film 3 is made of a colorless transparent thermoplastic resin material, such as PP or PVC, and the cover film 4 is made of aluminum. The container film 3 may, however, be made of a resin other than PP or PVC, and the cover film 4 may be made of a metal material other than aluminum or may be made of a resin material. The container film 3 is not limited to be colorless and transparent but may be colored and transparent.

(h) According to the embodiments described above, the container film 3 is configured to include a plurality of pocket portions 2 along the width direction of the container film 3. According to a modification, the container film 3 may be configured to include only one pocket portion 2 along the width direction of the container film 3.

(i) According to the embodiments described above, the PTP sheet 1 is illustrated as the packaging sheet. The technological concept of the present disclosure may also be applied to packaging sheets other than the PTP sheet 1. According to the embodiments described above, the tablet 5 is illustrated as the content. The content is, however, not limited to the tablet but may be, for example, a capsule, an electronic component, or a food item. The shape and the configuration of the pocket portions 2 may be appropriately altered, changed or modified according to, for example, the shape and the state of the content.

(j) According to the embodiments described above, the PTP sheet 1 as the packaging sheet has a plurality of pocket portions 2. The number of the pocket portions 2 provided in the packaging sheet is, however, not limited in any way. Accordingly, the technological concept of the present disclosure may also be applied to manufacture of a packaging sheet including only one pocket portion 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST

1 . . . PTP sheet (packaging sheet), 2 . . . pocket portion, 2*a* . . . bottom wall portion, 2*b* . . . lateral wall portion, 2*bd* . . . downstream-side lateral wall portion, 2*bl* . . . first front-side lateral wall portion (front-side lateral wall portion), 2*br* . . . second front-side lateral wall portion (second front-side lateral wall portion), 2*bu* . . . upstream-side lateral wall portion, 3 . . . container film, 4 . . . cover film, 5 . . . tablet (content), 10 . . . PTP packaging machine (packaging sheet manufacturing apparatus), 21 . . . inspection device, 51 . . . illumination device (irradiation unit), 52, 53 . . . cameras (imaging units), 54 . . . image processing device (determination unit), R1 . . . upstream-side position, R2 . . . middle-side position, R3 . . . downstream-side position

What is claimed is:

1. An inspection device used in manufacturing a packaging sheet that comprises a belt-shaped container film made of a resin and a cover film that closes a pocket in the container film, the inspection device comprising:
   an irradiator that radiates, before content is placed into the pocket, ultraviolet light toward one face of the container film;
   imaging devices that take images of the container film from another face side of the container film; and
   a processor that determines, based on the images, whether the pocket includes a pinhole, wherein
   at least two of the imaging devices are each disposed on respective sides of the container film in a width direction such that the pocket is placed between the two imaging devices,
   while the container film is being conveyed along a conveyance path, the two imaging devices take images of the pocket at a timing when the pocket is located at:
     an upstream-side position of the conveyance path where the two imaging devices take images of an upstream-side lateral wall portion of the pocket, wherein the upstream-side lateral wall portion is located on an upstream side of the pocket along a conveying direction of the container film;
     a middle-side position of the conveyance path where the two imaging devices take images of a bottom wall portion and front-side lateral wall portions of the pocket, wherein the front-side lateral wall portions each face the respective two imaging devices in the width direction; and
     a downstream-side position of the conveyance path where the two imaging devices take images of a downstream-side lateral wall portion of the pocket, wherein the downstream-side lateral wall portion is located on a downstream side of the pocket along the conveying direction, and
   the processor determines whether the pocket includes the pinhole based on the images that are taken by the two imaging devices and that include information on the downstream-side lateral wall portion, the front-side lateral wall portions, the upstream-side lateral wall portion, and the bottom wall portion.

2. The inspection device according to claim 1, wherein a number of the imaging devices comprised by the inspection device is exactly two.

3. The inspection device according to claim 1, wherein the container film comprises additional pockets,
   the pockets are arrayed along the conveying direction, and
   the imaging devices simultaneously take images of one of the pockets at the upstream-side position, another of the pockets at the middle-side position, and another of the pockets at the downstream-side position by one single imaging operation.

4. The inspection device according to claim 2, wherein the container film comprises additional pockets,
   the pockets are arrayed along the conveying direction, and
   the imaging devices simultaneously take images of one of the pockets at the upstream-side position, another of the pockets at the middle-side position, and another of the pockets at the downstream-side position by one single imaging operation.

5. The inspection device according to claim 1, wherein the two imaging devices are disposed on respective sides in the width direction, and
   the container film is placed between the two imaging devices.

6. The inspection device according to claim 2, wherein the two imaging devices are disposed on respective sides in the width direction, and
   the container film is placed between the pair of imaging devices.

7. The inspection device according to claim 3, wherein the two imaging devices are disposed on respective sides in the width direction, and
   the container film is placed between the pair of imaging devices.

8. The inspection device according to claim 4, wherein the two imaging devices are disposed on respective sides in the width direction, and
   the container film is placed between the pair of imaging devices.

9. A packaging sheet manufacturing apparatus, comprising:
   the inspection device according to claim 1.

10. A packaging sheet manufacturing apparatus, comprising:
    the inspection device according to claim 2.

11. A packaging sheet manufacturing apparatus, comprising:
    the inspection device according to claim 3.

12. A packaging sheet manufacturing apparatus, comprising:
    the inspection device according to claim 4.

13. A packaging sheet manufacturing apparatus, comprising:
    the inspection device according to claim 5.

14. A packaging sheet manufacturing apparatus, comprising:
    the inspection device according to claim 6.

15. A packaging sheet manufacturing apparatus, comprising:
the inspection device according to claim 7.

16. A packaging sheet manufacturing apparatus, comprising:
the inspection device according to claim 8.

17. An inspection method used in manufacturing a packaging sheet that comprises a belt-shaped container film made of a resin and a cover film that closes a pocket in the container film, the inspection method comprising:
- an irradiation process of radiating, before content is placed into the pocket, ultraviolet light toward one face of the container film;
- an imaging process of taking images of the container film from another face side of the container film using at least two of imaging devices each disposed on respective sides of the container film in a width direction such that the pocket portion is placed between the two imaging devices; and
- a determination process of determining, based on the images, whether the pocket includes a pinhole, wherein while the container film is being conveyed along a conveyance path, the imaging process takes, with the two imaging devices, images of the pocket at a timing when the pocket portion is located:
  - an upstream-side position of the conveyance path where the two imaging devices take images of an upstream-side lateral wall portion of the pocket, wherein the upstream-side lateral wall portion is located on an upstream side of the pocket along a conveying direction of the container film;
  - a middle-side position of the conveyance path where the two imaging devices take images of a bottom wall portion and front-side lateral wall portions of the pocket, wherein the front-side lateral wall portions each face the respective two imaging devices in the width direction; and
  - a downstream-side position of the conveyance path where the two imaging devices take images of a downstream-side lateral wall portion of the pocket, wherein the downstream-side lateral wall portion is located on a downstream side of pocket along the conveying direction, and the determination process determines whether the pocket portion includes the pinhole based on the images that are taken in the imaging process and that include information on the downstream-side lateral wall portion, the front-side lateral wall portions, the upstream-side lateral wall portion, and the bottom wall portion.

* * * * *